United States Patent
Shin et al.

(10) Patent No.: US 12,431,599 B2
(45) Date of Patent: Sep. 30, 2025

(54) ELECTRODE ASSEMBLY PREVENTING INTERNAL SHORT, SECONDARY BATTERY COMPRISING THE SAME, BATTERY MODULE AND BATTERY PACK

(71) Applicant: SK On Co., Ltd., Seoul (KR)

(72) Inventors: Jae Sik Shin, Daejeon (KR); Hee Gyoung Kang, Daejeon (KR); Joo Wan Kim, Daejeon (KR); Tae Il Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 661 days.

(21) Appl. No.: 17/697,675

(22) Filed: Mar. 17, 2022

(65) Prior Publication Data
US 2022/0302564 A1  Sep. 22, 2022

(30) Foreign Application Priority Data

Mar. 18, 2021 (KR) .................. 10-2021-0035083
Jan. 21, 2022 (KR) .................. 10-2022-0009127

(51) Int. Cl.
| | |
|---|---|
| H01M 50/586 | (2021.01) |
| H01M 4/52 | (2010.01) |
| H01M 10/42 | (2006.01) |
| H01M 50/46 | (2021.01) |

(52) U.S. Cl.
CPC ........... *H01M 50/586* (2021.01); *H01M 4/52* (2013.01); *H01M 10/4235* (2013.01); *H01M 50/46* (2021.01)

(58) Field of Classification Search
None
See application file for complete search history.

(56) References Cited

U.S. PATENT DOCUMENTS

| | | | |
|---|---|---|---|
| 2010/0203373 A1 | 8/2010 | Kawase et al. | |
| 2016/0240325 A1* | 8/2016 | Tajima | ......... H01M 50/533 |
| 2017/0047571 A1* | 2/2017 | Iwasaki | ......... H01M 50/103 |

FOREIGN PATENT DOCUMENTS

| | | | | |
|---|---|---|---|---|
| CN | 1925205 A | * | 3/2007 | ......... H01M 2/16 |
| JP | 2017-103164 A | | 6/2017 | |
| JP | 2017107719 A | * | 6/2017 | |
| JP | 2020-035564 A | | 3/2020 | |
| KR | 10-2010-0022533 A | | 3/2010 | |
| KR | 2020090471 A | * | 7/2020 | ......... H01M 10/0431 |
| WO | WO-2020090409 A1 | * | 5/2020 | ......... H01M 50/103 |

OTHER PUBLICATIONS

JP2017107719A English Translation (Year: 2017).*
KR 20200090471 A English Translation (Year: 2020).*
WO2020090409A English Translation (Year: 2020).*
CN 1925205 A English Translation (Year: 2007).*

* cited by examiner

*Primary Examiner* — Stewart A Fraser
(74) *Attorney, Agent, or Firm* — IP & T GROUP LLP

(57) ABSTRACT

An exemplary embodiment in the present disclosure relates to an electrode assembly capable of suppressing the occurrence of a short of a battery including an insulation film, a secondary battery including the electrode assembly, a battery module, and a battery pack. The electrode assembly includes an electrode laminate in which a cathode and an anode are alternately stacked with a separator as a boundary, a porous insulation film surrounding four or more sides of the electrode laminate, in which two of both ends of the insulation film are adhered on a side surface of the electrode laminate.

18 Claims, 9 Drawing Sheets

ELECTRODE ASSEMBLY PREVENTING INTERNAL SHORT, SECONDARY BATTERY COMPRISING THE SAME, BATTERY MODULE AND BATTERY PACK

CROSS-REFERENCE TO RELATED APPLICATION(S)

This application claims the benefit under 35 USC 119(a) of Korean Patent Application Nos. 10-2021-0035083 filed on Mar. 18, 2021 and 10-2022-0009127 filed on Jan. 21, 2022 in the Korean Intellectual Property Office, the entire disclosures of which are incorporated herein by references for all purposes.

BACKGROUND

The present disclosure relates to an electrode assembly capable of suppressing the occurrence of a short in a battery including an insulation film, a secondary battery including the electrode assembly, a battery module, and a battery pack.

In recent years, lithium ion batteries, nickel hydride batteries, and other secondary batteries are increasingly important as in-vehicle power sources or power sources for personal computers and portable terminals. In particular, a lithium ion battery that is lightweight and has high energy density is expected to be suitably used as a high-output power source for mounting on a vehicle.

Meanwhile, many attempts have been made to increase the energy density of the lithium secondary battery in recent years. In particular, in the case of the secondary batteries for vehicles, various studies are being attempted to improve overall energy density by increasing a size of a cell and increasing a volume density in a module.

In the case of secondary batteries for vehicles, efficient use of internal space is an important factor, as requirements for high energy density modules increase. Accordingly, in the related art, a size of a cathode is formed to be smaller than that of an anode, but the electrode design is in progress to increase energy density by gradually increasing the size of the cathode. However, in this case, there is a problem in that a short may occur inside the secondary battery.

As this type of battery, a battery structure having an electrode assembly in which a sheet-shaped cathode and a sheet-shaped anode are stacked together with a separator, or a separator elongated in a longitudinal direction is folded between the cathode and anode zigzag in a Z direction or in one direction has been known.

In general, a secondary battery is prepared by surrounding each electrode with a separator, fixing the separator using a tape or an adhesive, and then inserting the separator into a pouch or can-type battery case, in a step of preparing an electrode assembly.

However, in such a conventional secondary battery, the alignment of the electrode assembly may be easily released due to external vibration, shock, or the like, so an internal short may occur due to the movement of the electrode inside the battery case. In addition, in the case of the can-type secondary battery, an exterior material may have positive polarity, so the problem of the occurrence of a short due to the release of the alignment of the electrode assembly as described above becomes more serious.

SUMMARY

The present disclosure provides an electrode assembly capable of preventing a short inside a secondary battery by maintaining an alignment of electrodes even when external vibrations or shocks are applied, a secondary battery including the electrode assembly, and a battery module and battery pack including the secondary battery.

An exemplary embodiment in the present disclosure is to prevent a short inside a battery, and provides a secondary battery suppressing an internal short and having enhanced insulation properties by maintaining a shape of an electrode laminate using an insulation film on an exterior of the electrode laminate including an anode, a cathode, and a separator.

An exemplary embodiment in the present disclosure provides an electrode assembly, and the electrode assembly includes an electrode laminate in which a cathode and an anode are alternately stacked with a separator as a boundary, and a porous insulation film surrounding four or more sides of the electrode laminate, in which two of both ends of the insulation film are adhered on a side surface of the electrode laminate.

The insulation film may be adhered by contacting an outer surface of one end with an inner surface of the other end on one side of the electrode laminate.

The insulation film may surround four or more sides including two electrode active surfaces and two side surfaces of the electrode laminate.

The adhesion may be adhesion by an adhesive or adhesion by heat.

The insulation film may include a binder layer in which an adhesive binder is deposited on an inner surface, and may be attached to a surface of an external surface of the electrode assembly.

The insulation film may surround six sides of the electrode laminate, and have a rectangular body portion surrounding two electrode active surfaces and two side surfaces and a side cover part extending from a side surface of the body portion to surround the remaining two side surfaces.

The cover part may have a through-hole through which an electrode tab passes, and the electrode tab may protrude to an exterior of the insulation film through the through-hole.

The insulation film may be at least one selected from the group consisting of PE, PP, PI, PET, and PTFE.

The insulation film may have an insulation resistance of $10^3 \Omega$ or more based on 1000 V and 1 sec.

The insulation film may have a thickness of 30 to 150 µm.

The insulation film may have an expansion rate of 1.2 times or less through reaction with an electrolyte.

The insulation film may include an electrolyte absorbing member for moving an electrolyte to both surfaces.

A width of the insulation film in an electrode tab direction may be greater than that of the cathode, (width of separator+ (10% of width of separator)) or less.

The electrode laminate may be a stack-type electrode laminate, a Z-folding type electrode laminate, or a winding type electrode laminate.

The electrode laminate may be an electrode laminate in which a separator is wound 1 to 4 times on an outermost surface.

The cathode may contain Ni, Co, and Mn, and may include a cathode active material including a content of Ni of 80% or more.

According to another exemplary embodiment in the present disclosure, there is provided a secondary battery comprising an electrolyte included in a battery case in which the electrode assembly of claim 1 is accommodated.

One end of the insulation film exposed to an exterior may be directed toward an upper portion of the battery case.

According to another exemplary embodiment in the present disclosure, there is provided a battery module comprising the secondary battery as described above.

BRIEF DESCRIPTION OF DRAWINGS

The above and other aspects, features, and advantages of the present inventive concept will be more clearly understood from the following detailed description, taken in conjunction with the accompanying drawings, in which:

FIGS. 2A to 2C are diagrams schematically illustrating a case in which an insulation film for surrounding four sides of an electrode laminate is used, in which FIG. 2A is a diagram schematically illustrating the insulation film for surrounding four sides of the electrode laminate, FIG. 2B is a diagram schematically illustrating a state in which the electrode laminate is disposed on the insulation film, and FIG. 2C is a diagram schematically illustrating a cross-section viewed from an electrode tab side of a state in which the electrode laminate is fixed by surrounding an external surface of the electrode laminate with the insulation film;

FIGS. 5A to 5C are diagrams schematically illustrating a case in which the insulation film for surrounding six sides of the electrode laminate is used, in which FIG. 5A is a diagram schematically illustrating the insulation film for surrounding six sides of the electrode laminate, FIG. 5B is a diagram schematically illustrating a state in which the electrode laminate is disposed on the insulation film, and FIG. 5C is a diagram schematically illustrating a cross-section viewed from the electrode tab side in a state in which the electrode laminate is fixed by surrounding six sides of the electrode laminate with the insulation film;

DETAILED DESCRIPTION

An exemplary embodiment in the present disclosure is to provide an electrode assembly with enhanced insulation properties by using an insulation film with insulation properties provided on an exterior of an electrode laminate.

Hereinafter, an exemplary embodiment of the present disclosure will be described in more detail with reference to the accompanying drawings.

Figure 1:
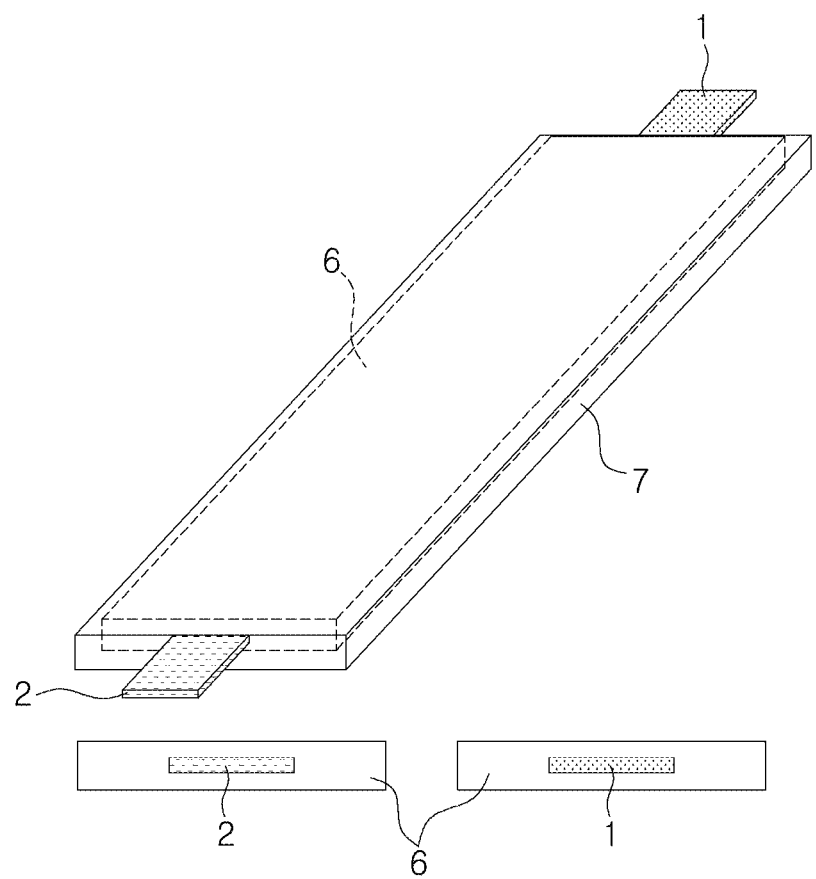
FIG. 1 is a perspective view schematically illustrating a conventionally provided secondary battery and a cross-sectional view schematically illustrating a cross-section of an electrode tab side of a conventional secondary battery.

As illustrated in FIG. 1, the electrode assembly of the conventional secondary battery is prepared by preparing an electrode assembly 6 by stacking a cathode having a cathode tab 1 and an anode having an anode tab 2 with a separator as a boundary, attaching an insulating tape or the like to the exterior of the electrode assembly 6 to maintain an alignment of the electrode laminate, and then accommodating the electrode laminate in a battery case 7 such as a pouch or a can. However, such a conventional electrode assembly may be easily misaligned when an external shock or the like is applied, which causes problems of the occurrence of an internal short or the like while a battery is being driven. Accordingly, an exemplary embodiment in the present disclosure provides an electrode assembly capable of more stably maintaining an alignment of an electrode laminate.

The electrode assembly according to an exemplary embodiment in the present disclosure is an electrode assembly in which an external surface of an electrode laminate prepared by alternately stacking an anode and a cathode with a separator as a boundary is surrounded with an insulation film.

The electrode laminate is not particularly limited as long as it is an electrode laminate in which an anode and a cathode are alternately stacked with a separator as a boundary, and may be a stack-type electrode laminate, or a Z-folding type or winding-type stack and folding electrode laminate.

Specifically, the stack-type electrode laminate is an electrode laminate in which a sheet-shaped separator of a predetermined size is inserted between a sheet-shaped cathode and a sheet-shaped anode, the Z-folding type stack and folding electrode laminate is an electrode laminate in which a separator elongated in one direction is folded zigzag in a Z or S direction, and a cathode and an anode are alternately inserted therebetween and stacked, and a winding-type stack and folding electrode laminate is an electrode laminate in which a separator elongated in one direction is folded by being wound in one direction and an anode and a cathode are alternately inserted and stacked, which may be easily understood by those skilled in the art to which the present disclosure belongs. Furthermore, the electrode laminate may be prepared by mixing a stack type, a Z folding type, or a winding type, and therefore, is not particularly limited.

If necessary, the electrode laminate may be wound with a separator on an outermost surface of the electrode laminate. In this way, when the outermost surface surface of the electrode laminate is wound with the separator, the separator forms a flat surface on the outermost surface surface, so the insulation film used in an exemplary embodiment in the present disclosure may be firmly and easily attached. The number of windings of the separator is not particularly limited, but the separator is preferably wound within the range of 1 to 4 times in consideration of the improvement in adhesion of the insulation film and the increase in thickness of the electrode laminate.

The electrode laminate generally has two electrode active surfaces on which an electrode active material layer is formed on an electrode current collector and four side surfaces formed by stacking a plurality of electrodes having a predetermined thickness. One or two of the four side surfaces are provided with electrode tabs.

An exemplary embodiment in the present disclosure is to maintain the alignment of the electrode laminate by surrounding the external surface surface of the electrode laminate with the insulation film.

The insulation film that may be used in an exemplary embodiment in the present disclosure is not particularly limited as long as it may provide insulation properties. As the insulation film, an insulating film formed of at least one polymer material selected from the group consisting of, for example, polyethylene (PE), polypropylene (PP), polyimide (PI), polyethyleneterephtalate (PET), and PTFE may be used.

The insulation film may include an electrolyte absorbing member penetrating through both surfaces of the insulation film. The electrolyte absorbing member is not particularly limited, and may be suitably used as long as it may absorb the electrolyte and move the electrolyte from one surface to the other surface of the insulating film.

The electrolyte absorbing member may include, for example, a porous material capable of absorbing an electrolyte, and may have various types of through-holes formed therein. The shape or size of the electrolyte absorbing member is not particularly limited and may vary. In addition, the electrolyte absorbing member may be arranged in a pattern having a certain shape or regulation, or may be arranged in a disordered pattern. In this way, the flow of the electrolyte is possible by forming the electrolyte absorbing member in the insulation film, so the impregnation of the electrolyte may be facilitated.

The insulation film preferably has an insulation resistance of $10^3 \Omega$ or more based on 1000 V and 1 sec. When the insulation resistance of the insulation film is less than $10^3 \Omega$, it may not be possible to secure sufficient insulation properties. On the other hand, the insulation film is preferable as it has high insulation properties, and an upper limit of the insulation resistance is not particularly limited.

The insulation film preferably has a thickness of 90±60 μm, that is, 30 to 150 μm. If the thickness of the insulation film is less than 30 μm, the physical strength is weak, which is not preferable in terms of mechanical stability. Meanwhile, when the thickness of the insulation film exceeds 150 μm, the thickness of the insulation film may be too thick, thereby causing the decrease in the overall battery capacity.

Meanwhile, it is preferable that the insulation film has an expansion rate reacted with the electrolyte of 1.2 times or less. When the expansion rate by the reaction with the electrolyte exceeds the above range, a thick battery may be obtained unlike the initially designed battery. In this case, the energy density may be lowered due to the high expansion rate.

After an insulation film having a size of 10 mm×10 mm is immersed in an electrolyte for 2 hours or more and the electrolyte is immersed into a polymer of the insulation film, the expansion rate may measure a change in volume of the insulation film before and after the immersion. Preferably, after performing an evaluation on a plurality of samples, an average of a maximum value and a minimum value may be determined as the volume after expansion and the expansion rate may be measured.

The insulation film preferably has a width W1 in an electrode tab withdrawal direction greater than that of a cathode and has a width within ±10% of a width of a separator, that is, within 90% to 110% of the width of the separator. That is, it is preferable that a lower limit of the width W1 of the insulation film is greater than that of the cathode. When the width W1 of the insulation film is smaller than that of the cathode, the cathode and anode may come into contact with each other, thereby causing a short. Meanwhile, when the upper limit of the width of the insulation film is smaller than that of the separator by exceeding 10%, the insulation film may not completely cover the cathode, and when the upper limit of the width of the insulation film is excessively greater than that of the separation film by exceeding 10%, an additional space is required to accommodate the insulation film, which is not preferable.

Figure 2A:
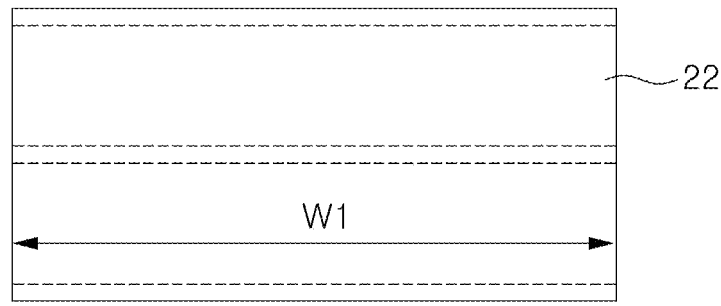

An insulation film 22 used in an exemplary embodiment may have a rectangular film shape as illustrated in FIG. 2A as an exemplary embodiment, and is preferably installed to cover at least four sides of the electrode laminate. For example, the surface surrounded with the insulation film 22 is two electrode active surfaces and two side surfaces, and the two side surfaces are not particularly limited, and may be two opposite surfaces of the surface on which the electrode tabs are formed and may be two surfaces opposing each other except for the surface on which the electrode tabs 11 and 12 are formed.

Figure 2B:
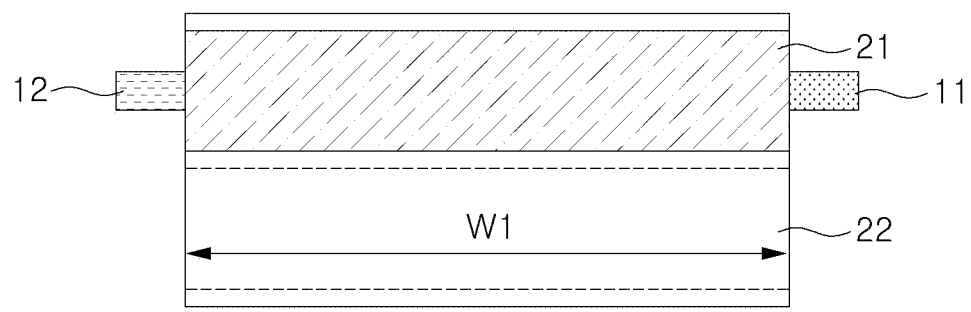
Figure 2C:
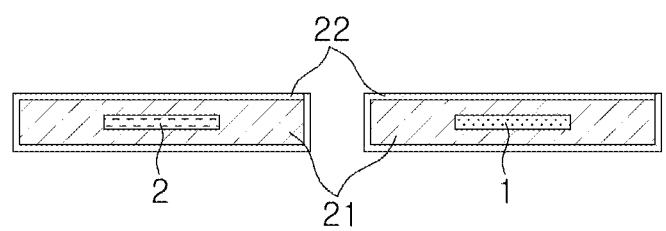

More preferably, as illustrated in FIG. 2B, the surface surrounded with the insulation film 22 may be two electrode active surfaces and two surfaces on which the electrode tabs 11 and 12 are not formed. For the electrode assembly so prepared, in a cross-sectional shape of the electrode laminate 21 when viewed from the side surface on which the electrode tabs 11 and 12 are formed, as illustrated in FIG. 2C, the electrode tabs 11 and 12 are located at a central portion, the electrode laminate 21 is located on the exterior, and the insulation film 22 surrounds the outermost surface.

In this case, the insulation film 22 may be wound around an external surface surface of an electrode laminate 21 one or more times to cover four sides of the electrode laminate 21. It is preferable that one end, which is a start point of the winding of the insulation film 22, and the other end, which is an end point of the winding, are located on the side surface of the electrode laminate 21. In this case, both ends of the insulation film 22 may be located on the same side surface, and may also be located on different side surfaces.

More preferably, both ends of the start point of the winding and the end point of the winding of the insulation film 22 may be located on the side surface of the electrode laminate 21. When both ends of the insulation film 22 are located on the electrode active surface, the insulation film 22 overlaps more compared to other locations due to the presence of the ends of the insulation film 22 to increase the thickness and decrease the space utilization, which may lead to the decrease in the overall battery capacity. The problem of the reduction in the space utilization and the decrease in the battery capacity may become more severe in a battery module unit.

More preferably, the insulation film 22 is wound once, and as illustrated in FIG. 2B, it is preferable that one end, which is the start point of the winding, and the other end, which is the end point of the winding, are located on one side surface of the electrode laminate 21, and overlap with and are in contact with each other so that an outer surface of one end and an inner surface of the other end are in contact with each other, thereby fixing the insulation film 22.

If necessary, as illustrated in FIG. 2A, the insulation film 22 may form a bending line so that it may be easily folded at positions corresponding to each corner of the electrode laminate 21.

The bonding may be made using an adhesive, as well as thermal bonding may be made by heating and pressing. The adhesive does not degrade the performance of the battery. The adhesive may be suitably used in the present disclosure as long as it is commonly used in the field of secondary batteries, and is not particularly limited. Furthermore, a thermal bonding temperature at the time of the thermal bonding may be appropriately selected according to the material of the insulation film 22, and is not particularly limited.

In an exemplary embodiment in the present disclosure, the insulation film 22 may further include a binder layer in which an adhesive binder is applied to an inner surface, that is, a surface in contact with the electrode laminate 21. In this way, the insulation film 22 may be firmly fixed to the surface of the electrode laminate 21, more specifically, to the surface of the separator by the binder layer. The binder layer may be formed on the entire surface of the insulation film 22, but is more preferable to be partially formed on the side surface that prevents pores from being closed. The binder layer may be formed in a predetermined pattern such as a dot shape and a stripe shape.

The binder is not particularly limited, and for example, an epoxy-based adhesive, an acrylic adhesive, or the like may be used.

Figure 3:
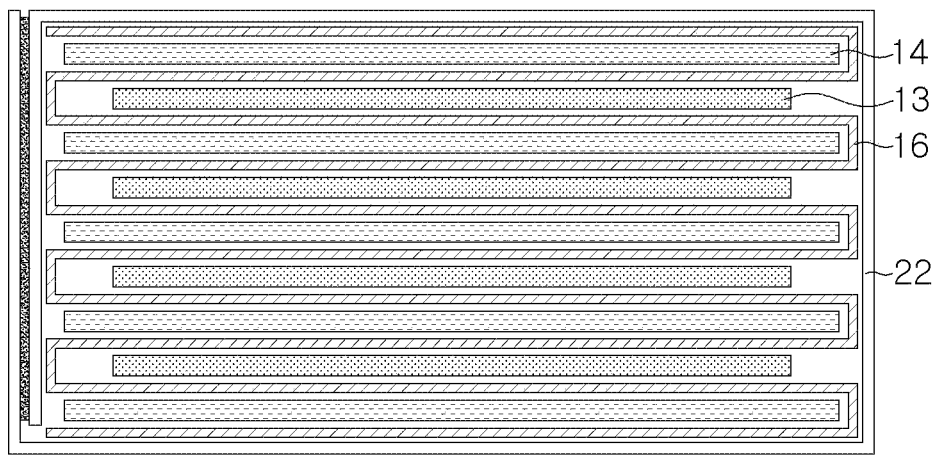
FIG. 3 is a diagram illustrating a cross-section of the electrode laminate surrounded with the insulation film and is a diagram schematically illustrating a structure in which both ends of the insulation film are overlapped and bonded.

The electrode assembly prepared using the insulation film 22 as described above is schematically illustrated in FIG. 3. FIG. 3 illustrates that an outermost surface surface of an electrode laminate in which an anode 14 and a cathode 13 are alternately stacked with a separator 16 as a boundary is surrounded with an insulation film 22, and both ends of the insulation film 22 is located on the side surface of the electrode laminate.

Figure 4:
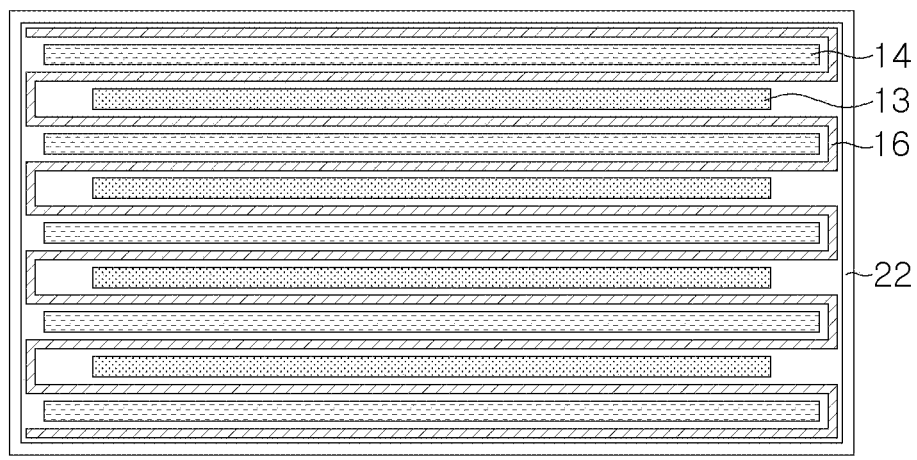
FIG. 4 is a diagram illustrating a cross-section of the electrode laminate surrounded with the insulation film, and is a diagram schematically illustrating another exemplary embodiment using an envelope-type insulation film.

Meanwhile, FIG. 4 is a cross-sectional view of an electrode assembly illustrating another example of the insulation film 22 surrounding the electrode laminate. As illustrated in FIG. 4, the insulation film 22 surrounding the electrode laminate may have a structure in which both ends have annular cross-section in which both ends are not separated and have openings penetrating in both directions. The insulation film 22 may be prepared so that a circumferential length of the opening of the insulation film 22 may correspond to a circumferential length of the cross section of the electrode laminate, and the electrode assembly may be prepared by inserting the electrode laminate into the opening of the insulation film 22. However, in this case, it is preferable that the adhesive layer is not formed on the inner surface.

Figure 5A:
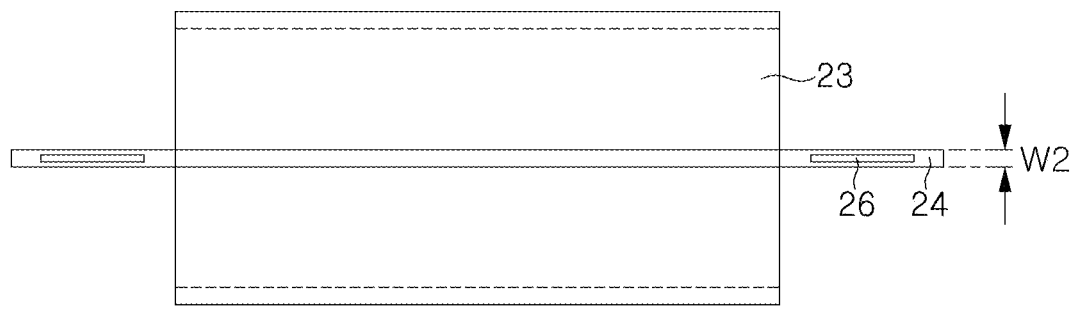

As another exemplary embodiment, the insulation film may have a structure surrounding six sides of the electrode laminate 21. Specifically, as illustrated in FIG. 5A, an insulation film having an insulation film main body portion 23 and an insulation film side surface cover part 24 may be used.

The insulation film main body portion 23 is substantially the same as the insulation film for surrounding the four sides that surrounds the electrode active surface and two side surfaces, and therefor, a detailed description thereof will be omitted.

The insulation film according to an exemplary embodiment has an insulation film side surface cover part 24. The insulation film side surface cover part 24 is for covering the other two surfaces of the electrode laminate 21 with the insulation film, and extends outward from the side surface of the insulation film main body portion 23. In this case, the length of the insulation film side surface cover part 24 may extend to the same length as the length of the side surface of the electrode laminate to be covered, but when the length of the insulation film side surface cover part 24 is formed longer, it is easy to adhere to the adjacent side surface, which is more preferable. In addition, the insulation film side surface cover part 24 may have a width W2 corresponding to the thickness of the electrode laminate or a wider width W2.

Furthermore, when the insulation film side surface cover part 24 covers the surface on which the electrode tabs 11 and 12 are formed, the insulation film side surface cover part 24 has an insulation film through-hole 26 through which the electrode tabs 11 and 12 may penetrate, and the insulation film through-hole 26 is formed to be larger than the width of the electrode tabs 11 and 12 so that it is easy to penetrate through the electrode tabs 11 and 12.

By surrounding the electrode laminate using such an insulation film, it is possible to surround all the two electrode active surfaces and the four side surfaces of the electrode laminate with the insulation film.

Figure 5B:
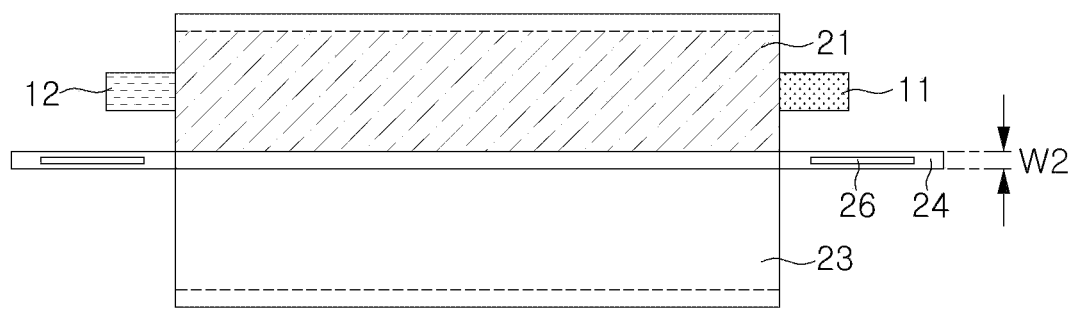

Meanwhile, as illustrated in FIG. 5B, by putting the electrode laminate 21 on the insulation film main body portion 23, winding the electrode laminate 21 one or more times with the insulation film main body portion 23, and preferably one time to surround four sides, and surrounding two surfaces with the insulation film side surface cover part 24 by penetrating the electrode tabs 11 and 12 through the insulation film through-hole 26, it is possible to surround all the outermost six sides of the electrode laminate 21 with the insulation film.

As described above, both ends of the insulation film overlap with each other on the side surface of the electrode laminate 21, more preferably on the same side surface, and even more preferably on the same side surface to adhere both ends of the insulation film main body portion 23, and the insulation film side surface cover part 24 may also be adhered together when both ends of the insulation film main body portion 23 are adhered on the side surface.

Figure 5C:
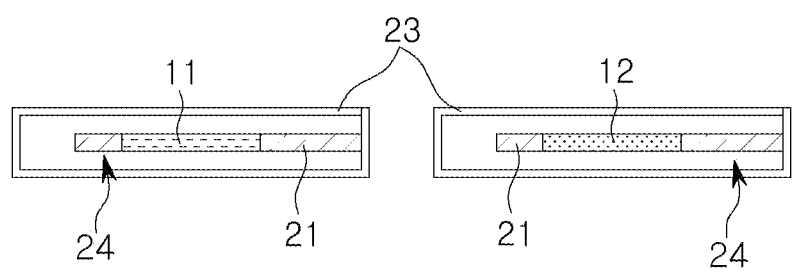

For the electrode assembly prepared according to an exemplary embodiment in the present disclosure, in a cross-sectional shape of the electrode laminate 21 when viewed from the side surface on which the electrode tabs 11 and 12 are formed, as illustrated in FIG. 5C, the electrode tabs 11 and 12 are located at a central portion of the electrode laminate 21, the electrode laminate is located on the exterior, and the insulation film main body portion 23 surrounds the outermost surface. The side surfaces on which the electrode tabs 11 and 12 are formed are also covered with an insulation film side surface cover part 24, and the electrode tabs 11 and 12 are exposed to the exterior through the insulation film through-hole 26.

Among the matters described for the insulation film applied to four sides, such as the winding, adhering, and bending line of the insulation film, the detailed description applicable to the exemplary embodiment for the insulation film applied to six sides will be omitted for redundant explanation.

Meanwhile, in the electrode laminate, each electrode of the anode and the cathode may include an electrode mixture part coated with an electrode mixture including an electrode active material, a binder, and a conductive agent on an electrode current collector, and an uncoated part on which the electrode mixture is not applied. The electrode active material, binder, and conductive agent constituting the electrode mixture are not particularly limited, and may be suitably used as long as they are commonly used in preparing the anode and cathode.

Specifically, the cathode includes a cathode mixture layer formed on a cathode current collector, and the cathode mixture layer includes a cathode active material, a conductive agent, and a binder, and may further include a thickener if necessary.

As the cathode active material, the compound capable of reversible insertion and desorption of lithium (a lithiated intercalation compound) may be used. Specifically, at least one of a complex oxide of lithium and a metal selected from cobalt, manganese, nickel, and combinations thereof may be used.

A more specific example may be a lithium transition metal compound (oxide) having a layered structure as represented by a general formula $LiMO_2$, where M may include at least one of transition metal elements such as Ni, Co, and Mn, and may further include other metal elements or non-metal elements. Examples of the composite oxide may include a monolithic lithium transition metal composite oxide containing one type of the transition metal element, a so-called binary lithium transition metal composite oxide containing two types of the transition metal element, and a ternary lithium transition metal composite oxide containing Ni, Co and Mn as constituent elements as transition metal elements, and preferably, a ternary lithium transition metal composite oxide such as $Li(Ni_{1/3}Co_{1/3}Mn_{1/3})O_2$. Here, a content of Ni may be 80% or more.

In addition, a lithium transition metal compound (oxide) represented by the general formula $Li_2MO_3$, wherein M includes at least one of transition metal elements such as Mn, Fe, and Co, and may further include another metal element or a non-metal element, for example, $Li_2MnO_3$, $Li_2PtO_3$, etc.

Also, the cathode active material may be a solid solution of $LiMO_2$ and $Li_2MO_3$, and may be a solid solution represented by, for example, $0.5LiNiMnCoO_2$-$0.5Li_2MnO_3$.

Furthermore, a material having a coating layer on the surface of the cathode active material may be used, or a mixture of the compound and a compound having a coating layer may be used. The coating layer may include at least one coating element compound selected from the group consisting of oxide, hydroxide, oxyhydroxide, oxycarbonate, and hydroxycarbonate of a coating element. The compound constituting these coating layers may be amorphous or crystalline. As the coating element included in the coating layer, Mg, Al, Co, K, Na, Ca, Si, Ti, V, Sn, Ge, Ga, B, As, Zr, or a mixture thereof may be used.

More preferably, the cathode active material may be a LiNiCoMnO-based cathode active material having a content of Ni of 80% or more.

In the cathode, the cathode active material may be 90 to 98 wt % based on the weight of the cathode mixture.

The binder may serve to bind particles of the cathode active material to each other and also to bind the cathode current active material to the cathode current collector, and the content of the binder may be 1.5 to 5 wt % based on the weight of the cathode mixture.

Examples of the binder may include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, nylon, etc.

Together with the binder, a thickener may be further included to impart viscosity. The thickener may include a cellulose-based compound, and examples of the thickener may include a mixture of one or more of carboxymethyl cellulose, hydroxypropyl methyl cellulose, methyl cellulose, alkali metal salts thereof, or the like. As the alkali metal, Na, K, or Li may be used. The content of the thickener may be 0.1 to 3 parts by weight based on 100 parts by weight of the anode active material.

The conductive agent is used to impart conductivity to the cathode, and may be suitably used as long as it is an electronically conductive agent commonly used in the cathode of the secondary battery. As examples of the conductive agent may include carbon-based materials such as natural graphite, artificial graphite, carbon black, acetylene black, ketjen black, and carbon fibers; metal-based materials, such as metal powders, such as copper, nickel, aluminum, and silver, or a metal fiber; conductive polymers such as polyphenylene derivatives; or a mixture thereof.

The conductive agent may be used in an amount of 0.1 to 3 wt % based on the weight of the cathode mixture layer.

As the cathode current collector, as a metal having good conductivity, for example, aluminum, nickel, titanium, stainless steel, etc., may be used, and may be in various forms such as a sheet type, a thin type, and a mesh type. The thickness of the cathode current collector is not particularly limited, and may be, for example, 5 to 30 μm.

The anode includes an anode mixture layer formed on at least one surface of an anode current collector, and the anode mixture layer includes an anode active material, a conductive agent, and a binder, and may further include a thickener if necessary.

As the anode active material, a carbon-based anode active material may be used. The carbon-based anode active material may be suitably used as long as it is commonly used in the preparation of the anode of the lithium ion secondary battery, and is not particularly limited, but may be artificial graphite or a mixture of artificial graphite and natural graphite. In the case of using the artificial graphite or a crystalline carbon-based material that is the mixture of the artificial graphite and natural graphite as the anode active material, crystallographic properties of the particles are further developed than in the case of using an amorphous carbon-based active material, so it is possible to further improve orientation characteristics of the carbon material, thereby improving the orientation of voids.

The form of the artificial graphite or the natural graphite may be amorphous, plate-like, flake-like, spherical, fibrous, or a combination thereof. In addition, when the artificial graphite and natural graphite are mixed and used, the mixing ratio may be 70:30 to 95:5 by wt %.

In addition, the anode active material may further include at least one of a Si-based anode active material, a Sn-based anode active material, or a lithium vanadium oxide anode active material together with the carbon-based anode active material. When the anode active material further includes the above-described active material, the anode active material may be included in the range of 1 to 50 wt % based on the total weight of the anode active material.

The Si-based anode active material may be Si, a Si—C composite, $SiO_x$ ($0<x<2$), and a Si-Q alloy, and the Q may be, other than Si, an element selected from the group consisting of alkali metals, alkaline earth metals, Group 13 elements, Group 14 elements, Group 15 elements, Group 16 elements, transition metals, rare earth elements, and combinations thereof. Specifically, the Q may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and combinations thereof.

The Sn-based anode active material may be Sn, $SnO_2$, a Sn—R alloy, and the R may be, other than Sn and Si, an element selected from the group consisting of alkali metals, alkaline earth metals, Group 13 elements, Group 14 elements, Group 15 elements, Group 16 elements, transition metals, rare earth elements, and combinations thereof. Specifically, the R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and combinations thereof. In addition, at least one of these elements and $SiO_2$ may be mixed and used.

The anode active material may include a content of 94 to 98% by weight based on the weight of the anode mixture layer.

In an exemplary embodiment, the anode mixture includes a binder. The binder serves to bind the anode active material particles to each other, and also serves to bind the anode active material well to the anode current collector. As the binder, an aqueous binder may be used.

Examples of the aqueous binder include styrene-butadiene rubber (SBR), acrylated styrene-butadiene rubber, acrylonitrile-butadiene rubber, acrylic rubber, butyl rubber, an ethylene-propylene copolymer, polyepichlorohydrin, polyphosphazene, polyacrylonitrile, polystyrene, an ethylene-propylene-diene copolymer, polyvinylpyridine, chlorosulfonated polyethylene, latex, a polyester resin, an acrylic resin, a phenol resin, an epoxy resin, a polyvinyl alcohol resin, an acrylate-based resin, or combinations thereof.

In the anode active material layer, the content of the binder may be 1.5 to 3 wt % based on the weight of the anode mixture layer.

Together with the binder, a thickener may be further included to impart viscosity. The content of the thickener may be 0.1 to 3 parts by weight based on 100 parts by weight of the anode active material.

The conductive agent is used to impart conductivity to the electrode, and may be used without limitation as long as it is commonly used in secondary batteries. As examples of the conductive agent may include carbon-based materials such as natural graphite, artificial graphite, carbon black, acetylene black, ketjen black, carbon fibers, and carbon nanotubes; metal-based materials, such as metal powders, such as copper, nickel, aluminum, and silver, or a metal fiber; conductive polymers such as polyphenylene derivatives; or conductive agents including a mixture thereof.

The conductive agent may be used in an amount of 0.1 to 3 wt % based on the weight of the anode mixture layer.

As the anode current collector, those selected from the group consisting of copper foil, nickel foil, stainless steel foil, titanium foil, nickel foam, copper foam, a polymer substrate coated with a conductive metal, and combinations thereof may be used. The thickness of the anode current collector is not particularly limited, and may be, for example, 5 to 30 μm.

Meanwhile, the separator may be applied without limitation as long as it is commonly used as a separator for a secondary battery, and examples of the separator may include one formed of a porous polyolefin-based resin such as polyethylene. Furthermore, inorganic particles may be coated on the surface.

The electrode assembly provided in an exemplary embodiment in the present disclosure is accommodated and sealed in a battery case and provided as a secondary battery. The battery case is not particularly limited, and may be a pouch-type battery case formed of a laminate sheet including an aluminum film therein, and may be a metal can.

Figure 6:
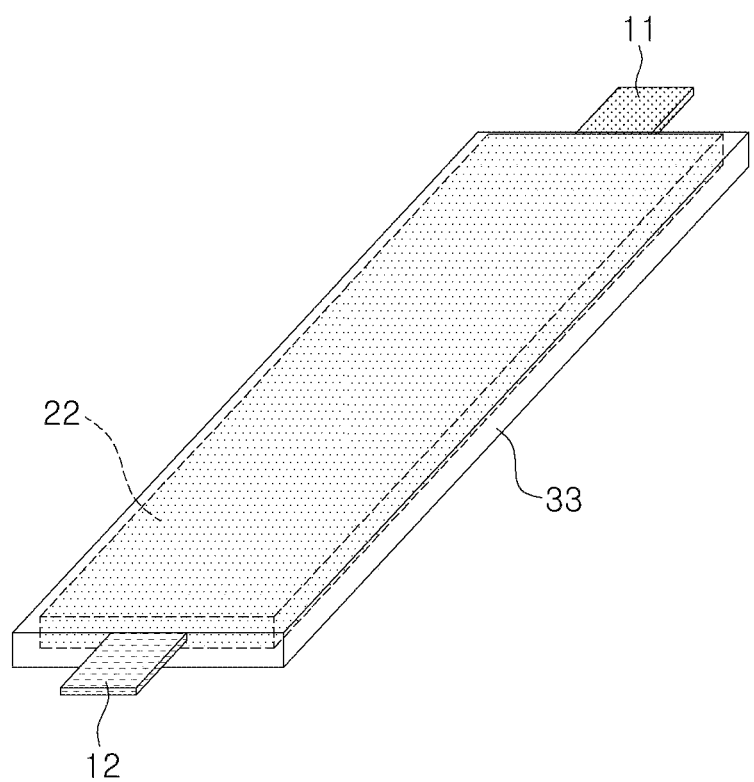
FIG. 6 is a perspective view schematically illustrating an electrode assembly in which the six sides of the electrode laminate are surrounded with the insulation film.

A structure of a secondary battery provided according to an exemplary embodiment in the present disclosure is schematically illustrated in FIG. 6. As illustrated in FIG. 6, it is possible to prevent the electrodes in the electrode laminate from deviating from the alignment by surrounding the surfaces of the six external surfaces of the electrode laminate with the insulation film 22, and prevent the battery case 33 and the electrode laminate from being in contact with each other.

Figure 7:
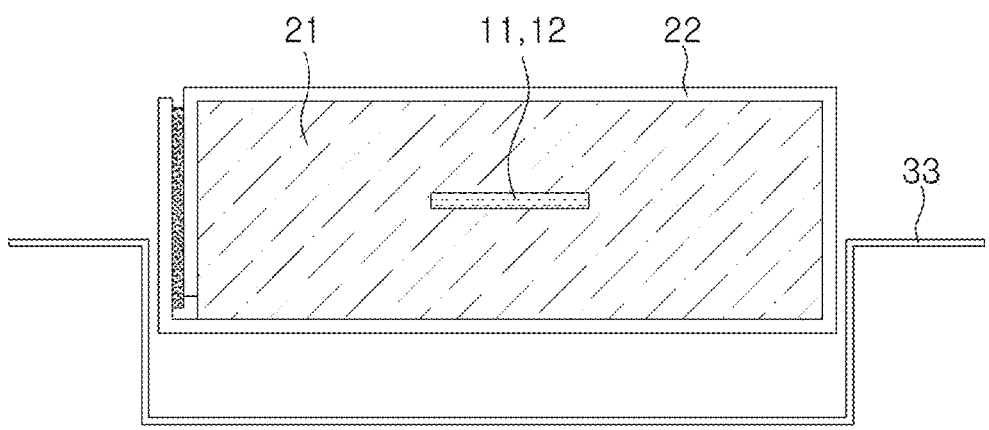
FIG. 7 is a diagram schematically illustrating a direction in which the electrode assembly in which the electrode laminate is surrounded with the insulation film is inserted into a battery case.

As such, when the electrode assembly provided in an exemplary embodiment in the present disclosure is accommodated in the battery case 33, in the electrode assembly, it is preferable that one end exposed to the exterior of both ends of the insulation film 22 is inserted to be directed toward the upper portion of the battery case 33. FIG. 7 schematically illustrates an example of accommodating the electrode assembly according to an exemplary embodiment in the present disclosure in the battery case 33. On the other hand, when one end of the insulation film 22 exposed in the opposite direction, that is, to the exterior is directed toward the lower portion of the battery case 33, there may be a problem that one end of the insulation film 22 is in contact with an edge end of the battery case 33 and thus the adhered portion may be peeled off. As described above, when one end of the insulation film 22 exposed to the exterior is accommodated to be directed toward the upper portion of the battery case 33, such peeling may be prevented, so the electrode assembly may be accommodated more easily.

Accordingly, it is possible to provide the secondary battery in which the electrode assembly is accommodated in the battery case. In an exemplary embodiment in the present disclosure, a battery in which one electrode assembly is accommodated in a battery case has been described, but may have a parallel structure in which two or more electrode assemblies are inserted into the battery case, and are electrically connected in parallel. It is possible to increase the width of the battery by having such parallel structure.

Furthermore, another exemplary embodiment in the present disclosure also provides a battery module and battery pack including the secondary battery.

According to the method of an exemplary embodiment as described above, by covering the external surface portion of the electrode laminate with the insulation film, it is possible to prevent the electrodes of the electrode laminate, particularly, physically block the contact between the battery case and the electrode laminate by the insulation film, thereby preventing the short inside the battery from occurring.

EXAMPLES

Hereinafter, the present disclosure will be described in more detail reference to examples. However, the following examples show a specific example of the present disclosure, and are not intended to limit the present disclosure.

Example 1

An electrode laminate was prepared by stacking an anode and a cathode with a separator as a boundary.

As illustrated in FIGS. 5A to 5C, an electrode assembly was prepared by disposing an insulation film formed with an insulation film (PE) main body portion and an insulation film side surface cover having an electrode tab through-hole on the prepared electrode laminate to surround the electrode laminate and covering six sides of the electrode laminate with the insulation film (fastening pressure of the insulating film of 600N).

Thereafter, a battery was prepared by inserting the electrode assembly into a pouch exterior material and sealing the electrode assembly, and injecting an electrolyte.

A change in battery characteristics (temperature and voltage) according to heat exposure were evaluated for the prepared battery. The evaluation conditions at the time of the heat exposure evaluation were performed as follows.

The temperature was increased by 5° C. per minute from 25° C., and for every 5° C. increase, the temperature was maintained for 30 minutes.

Figure 8:
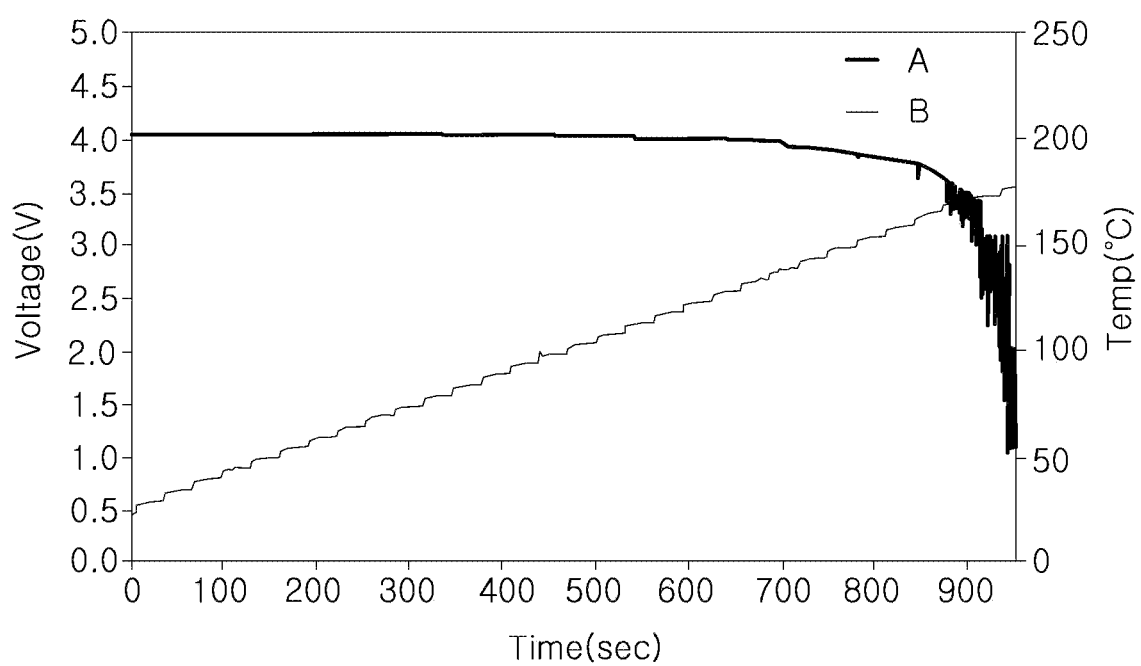
FIG. 8 is a graph illustrating an evaluation of a change in battery characteristics (temperature and voltage) according to heat exposure to the battery according to the exemplary embodiment.
Figure 9:
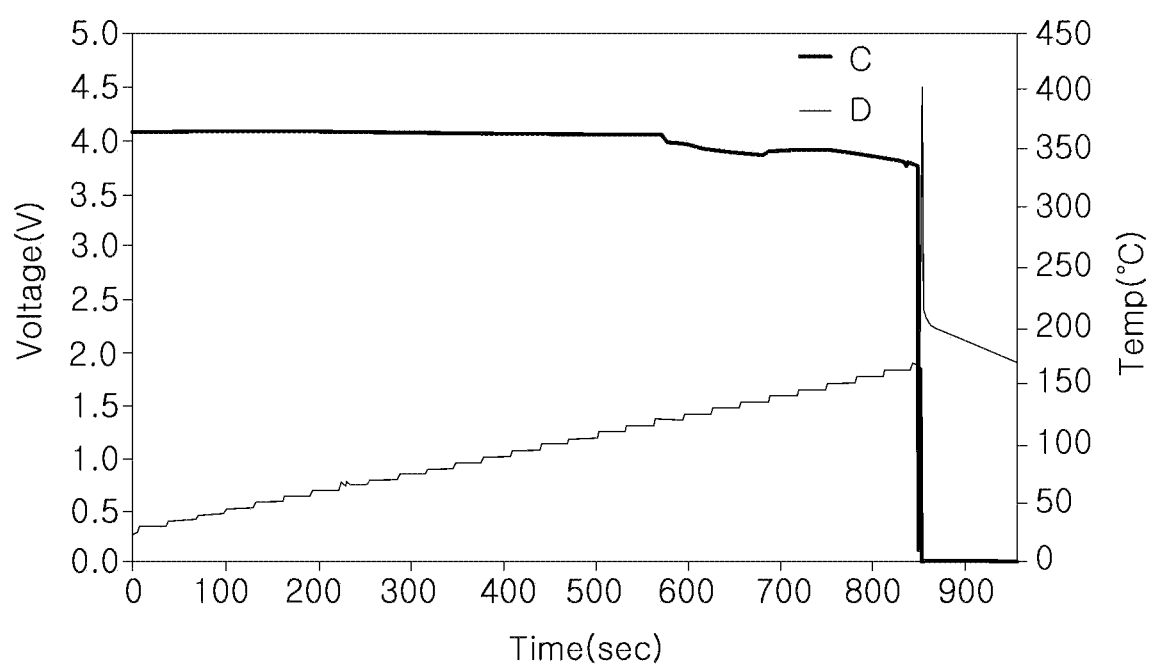
FIG. 9 is a graph illustrating the evaluation of the change in battery characteristics (temperature and voltage) according to the heat exposure to the battery that does not include the insulation film.

During the thermal exposure evaluation as described above, the temperature and voltage according to the passage of time appearing in the battery were measured, and the results are shown in FIG. 8. For comparison, the same thermal exposure evaluation was performed on the battery to which the insulating film was not applied, and the results are shown in FIG. 9. A of FIG. 8 and C of FIG. 9 are graphs tracking voltage fluctuations, and B of FIG. 8 and D of FIG. 9 are graphs tracking temperature changes.

As can be seen from FIG. 8, the battery to which the insulating film is applied according to an exemplary embodiment in the present disclosure does not show a rapid temperature change at 165° C., which was evaluated to represent EUCAR Level (The European Council for Automotive R&D) L4. On the other hand, in the case of the battery to which the insulation film was not applied, the temperature rapidly increased due to the occurrence of a short when it reached 165° C., which was evaluated to represent EUCAR Level L5.

As set forth above, according to an exemplary embodiment in the present disclosure, it is possible to suppress electrodes of an electrode laminate from deviating from alignment by surrounding an external surface of the electrode laminate with an insulation film, thereby preventing an internal short from occurring.

What is claimed is:

1. An electrode assembly, comprising:
an electrode laminate in which a cathode and an anode are alternately stacked with a separator as a boundary; and
a porous insulation film surrounding four or more sides of the electrode laminate,
wherein the insulation film comprises one end which is the start point of the winding, and the other end which is the end point of the winding,
wherein both ends of the insulation film are adhered on one side surface of the electrode laminate,
wherein the insulation film is adhered by contacting an outer surface of one end with an inner surface of the other end on the one side surface of the electrode laminate.

2. The electrode assembly of claim 1, wherein the insulation film surrounds four or more sides including two electrode active surfaces and two side surfaces of the electrode laminate.

3. The electrode assembly of claim 1, wherein the adhesion is made by an adhesive or heat.

4. The electrode assembly of claim 1, wherein the insulation film includes a binder layer in which an adhesive binder is deposited on an inner surface, and is attached to a surface of the electrode assembly.

5. The electrode assembly of claim 1, wherein the insulation film surrounds six sides of the electrode laminate, and has a rectangular body portion surrounding two electrode active surfaces and two side surfaces and a side cover part extending from a side surface of the body portion to surround the remaining two side surfaces.

6. The electrode assembly of claim 5, wherein the side cover part has a through-hole through which an electrode tab passes, and the electrode tab protrudes to an exterior of the insulation film through the through-hole.

7. The electrode assembly of claim 1, wherein the insulation film is at least one selected from the group consisting of PE, PP, PI, PET, and PTFE.

8. The electrode assembly of claim 1, wherein the insulation film has an insulation resistance of 103 2 or more based on 1000 V and 1 sec.

9. The electrode assembly of claim 1, wherein the insulation film has a thickness of 30 to 150 μm.

10. The electrode assembly of claim 1, wherein the insulation film has an expansion rate of 1.2 times or less through reaction with an electrolyte.

11. The electrode assembly of claim 1, wherein the insulation film is to include an electrolyte absorbing member for moving an electrolyte to both surfaces.

12. The electrode assembly of claim 1, wherein a width of the insulation film in an electrode tab direction is greater than that of the cathode, and 110% of a width of the separator or less.

13. The electrode assembly of claim 1, wherein the electrode laminate is a stack-type electrode laminate, a Z-folding type electrode laminate, or a winding type electrode laminate.

14. The electrode assembly of claim 1, wherein the electrode laminate is an electrode laminate in which a separator is wound 1 to 4 times on an outermost surface.

15. The electrode assembly of claim 1, wherein the cathode contains Ni, Co, and Mn, and includes a cathode active material including a content of Ni of 80 mol % or more.

16. A secondary battery comprising an electrolyte included in a battery case in which the electrode assembly of claim 1 is accommodated.

17. The secondary battery of claim 16, wherein one end of the insulation film exposed to an exterior is directed toward an upper portion of the battery case.

18. A battery module comprising the secondary battery of claim 16.

* * * * *

UNITED STATES PATENT AND TRADEMARK OFFICE
CERTIFICATE OF CORRECTION

PATENT NO. : 12,431,599 B2  
APPLICATION NO. : 17/697675  
DATED : September 30, 2025  
INVENTOR(S) : Jae Sik Shin et al.

Page 1 of 1

It is certified that error appears in the above-identified patent and that said Letters Patent is hereby corrected as shown below:

In the Specification

In Column 14, Line 19, please change "insulation resistance of 103 2 or more" should be --insulation resistance of 103 Ω or more--.

Signed and Sealed this  
Ninth Day of December, 2025

John A. Squires  
*Director of the United States Patent and Trademark Office*